United States Patent
Kato (10) Patent No.: US 8,636,366 B2
(45) Date of Patent: Jan. 28, 2014

(54) LIGHTING APPARATUS INCLUDING A LIGHT SOURCE, A FIRST MIRROR, AND A SECOND MIRROR DISPOSED BETWEEN THE LIGHT SOURCE AND THE FIRST MIRROR

(75) Inventor: Atsushi Kato, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 323 days.

(21) Appl. No.: 12/736,290

(22) PCT Filed: Mar. 28, 2008

(86) PCT No.: PCT/JP2008/056033
§ 371 (c)(1),
(2), (4) Date: Sep. 27, 2010

(87) PCT Pub. No.: WO2009/118880
PCT Pub. Date: Oct. 1, 2009

(65) Prior Publication Data
US 2011/0013145 A1  Jan. 20, 2011

(51) Int. Cl.
| | | |
|---|---|---|
| G03B 21/00 | (2006.01) |
| G03B 21/28 | (2006.01) |
| G02B 5/00 | (2006.01) |
| G02B 5/02 | (2006.01) |
| G02B 6/32 | (2006.01) |
| G02B 6/34 | (2006.01) |
| G02B 7/00 | (2006.01) |
| G02B 27/00 | (2006.01) |
| G01S 1/00 | (2006.01) |
| G09B 9/00 | (2006.01) |
| F21V 7/04 | (2006.01) |
| F21V 11/00 | (2006.01) |
| H01S 3/00 | (2006.01) |
| H01S 3/30 | (2006.01) |
| H01P 5/00 | (2006.01) |
| H01J 5/16 | (2006.01) |

(52) U.S. Cl.
USPC .............. 353/81; 353/33; 353/98; 353/99; 359/894; 362/553; 362/558; 385/34; 385/36

(58) Field of Classification Search
USPC .............. 353/20, 33, 81, 94, 98–99, 122, 37; 359/894; 362/551, 553, 558; 385/31, 385/33–34, 36, 129; 349/62, 67
See application file for complete search history.

(56) References Cited

U.S. PATENT DOCUMENTS 6,517,211 B2 * 2/2003 Mihara .................... 353/98
6,698,891 B2  3/2004 Kato
(Continued)

FOREIGN PATENT DOCUMENTS

JP  2003-98483 A  4/2003
JP  2003-202523 A  7/2003
(Continued)

*Primary Examiner* — Tony Ko
*Assistant Examiner* — Jori S Reilly-Diakun
(74) *Attorney, Agent, or Firm* — McGinn IP Law Group, PLLC (57) ABSTRACT

A lighting apparatus of the present invention includes light source (101), rod integrator (105), reflecting mirror (103), diffusion plate (104) disposed adjacently to reflection mirror (103), reflective polarizing plate (107), and wavelength plate (106). The lighting apparatus further includes curved mirror (102) disposed among light source (101), reflecting mirror (103), and diffusion plate (104). Reflecting mirror (103) and curved mirror (102) include apertures (102a and 103a) formed to allow at least light from light source (101) to pass. Curved mirror (102) reflects light leaked from the entrance plane side of rod integrator (105) toward aperture (103a) of reflecting mirror (103).

13 Claims, 8 Drawing Sheets

(56) References Cited

U.S. PATENT DOCUMENTS

| | | | |
|---|---|---|---|
| 6,739,723 B1* | 5/2004 | Haven et al. | 353/20 |
| 6,795,243 B1* | 9/2004 | McGettigan et al. | 359/485.05 |
| 7,040,766 B2* | 5/2006 | Hibi et al. | 353/99 |
| 7,125,120 B2* | 10/2006 | Aruga | 353/20 |
| 7,298,940 B2* | 11/2007 | Abu-Ageel | 385/31 |
| 7,510,316 B2 | 3/2009 | De Vaan | |
| 2003/0021098 A1* | 1/2003 | Chang | 362/19 |
| 2006/0196944 A1* | 9/2006 | Maeda et al. | 235/462.42 |
| 2008/0278689 A1* | 11/2008 | Read et al. | 353/7 |

FOREIGN PATENT DOCUMENTS

| | | |
|---|---|---|
| JP | 2004-212759 A | 7/2004 |
| JP | 2005-070271 A | 3/2005 |
| JP | 2006-220912 A | 8/2006 |
| JP | 2007-65425 A | 3/2007 |
| JP | 2007-519178 A | 7/2007 |
| JP | 2007-280793 A | 10/2007 |
| WO | WO 2006/090681 A1 | 8/2006 |

* cited by examiner

LIGHTING APPARATUS INCLUDING A LIGHT SOURCE, A FIRST MIRROR, AND A SECOND MIRROR DISPOSED BETWEEN THE LIGHT SOURCE AND THE FIRST MIRROR

TECHNICAL FIELD

The present invention relates to a lighting apparatus and a projector.

BACKGROUND ART

There is known a projector that uses, as a light source, a high-luminance white light source such as a discharge lamp. Recently, research and development have actively been pursued to apply light sources other than the discharge lamp for the projector.

A solid-state light source such as a LED or a laser attracts attention as a light source excellent in life and color reproducibility. Particularly, the laser has characteristics of linear beam advancement and a single wavelength. The laser can accordingly contribute, when used as a light source for the projector, to miniaturization and higher performance of the apparatus.

However, when the laser is used as the light source for the projector, a beam is highly coherent, and hence the reduction of speckle noise is needed.

JP2007-280793A, which is a technology related to the present invention, discloses a compact lighting apparatus capable of reducing speckles.

Figure 1:
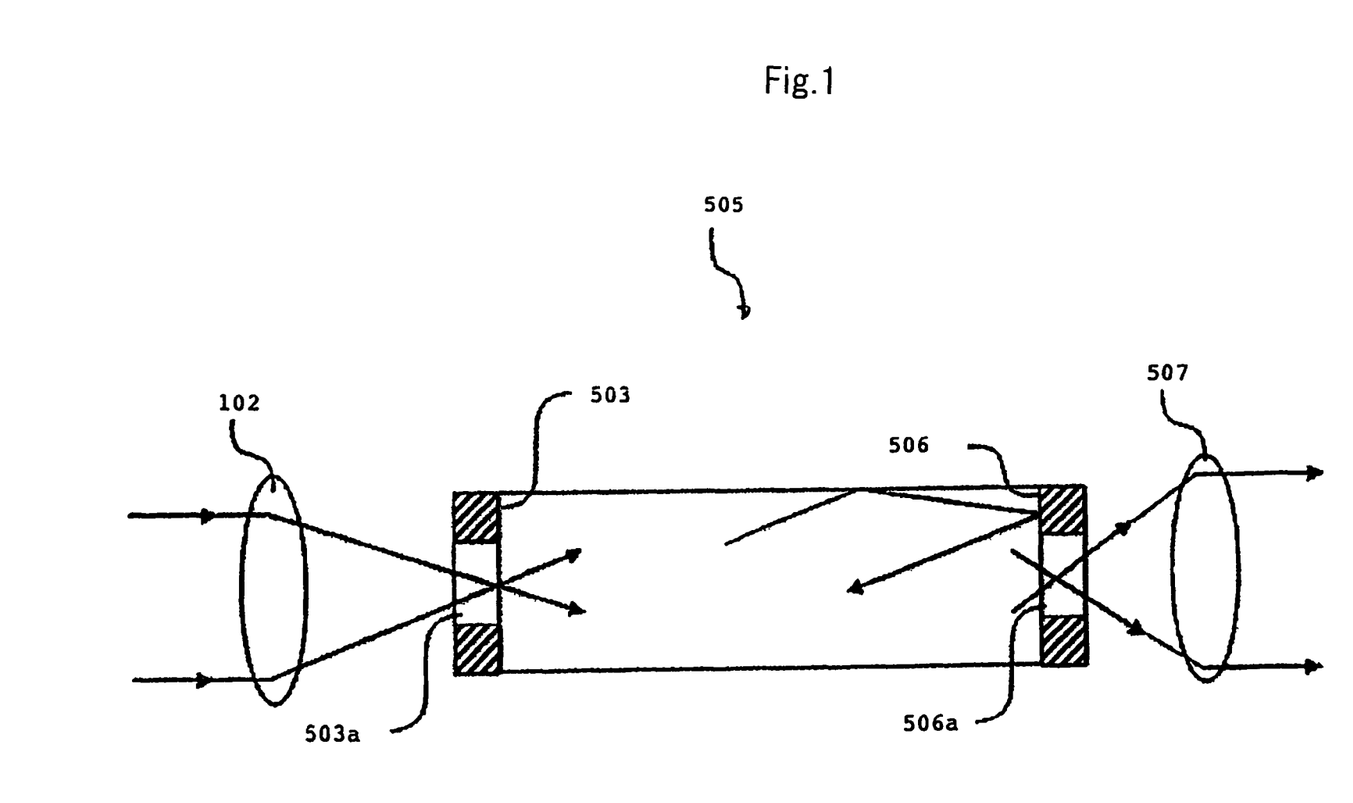
FIG. 1 is a diagram illustrating a configuration of a lighting apparatus related to the present invention.

As illustrated in FIG. 1, the lighting apparatus includes a light source such as a laser, light guide 505, entrance-side reflecting unit 503, and exit-side reflecting unit 506. Light guide 505 is a member to receive light from the light source. Entrance-side reflecting unit 503 is disposed on an entrance-side end surface of light guide 505, and aperture 503a is formed therein. Exit-side reflecting unit 506 is disposed on an exit-side end surface of light guide 505, and aperture 506a is formed therein.

The light that has entered light guide 505 is repeatedly reflected on an inner surface in light guide 505 to exit from aperture 506a of the exit side. In other words, light guide 505 is similar in operation to a rod integrator. The angle of the light from the light source is once widened. The light whose angle is widened is condensed at aperture 503a of the entrance side of light guide 505 by condenser lens 102. The light that has exited from light guide 505 is parallelized by a lens system to illuminate an image display panel.

As described above, a light flux that has entered from aperture 503a of the entrance side of light guide 505 is repeatedly reflected on the inner surface in light guide 505 to advance, and exits from aperture 506a of the exit side. On the other hand, light unable to exit from aperture 506a of the exit side of light guide 505 is reflected by exit-side reflecting unit 506. The light reflected by exit-side reflecting unit 506 advances toward the entrance side of light guide 505, and is reflected by entrance-side reflecting unit 503 excluding aperture 503a of the entrance side. The light reflected by entrance-side reflecting unit 503 is changed again in the advancing direction to the exit side. The light that has reached the aperture of exit-side reflecting unit 506 can exit from light guide 505 to be used as illumination light.

By reciprocating the light from the light source between exit-side reflecting unit 506 and entrance-side reflecting unit 503, as described above, the phase distribution of the light flux exiting from light guide 505 is randomly changed. Even a light source such as a laser source where coherence is high can reduce interferences between rays. Thus, the lighting apparatus disclosed in JP2007-280793A can reduce speckles of a projected image as a projector.

DISCLOSURE OF THE INVENTION

Problem to be Solved by the Invention

However, in the lighting apparatus disclosed in JP2007-280793A, while a speckle reduction effect can be expected to a certain extent, there is room for improvement in light use efficiency. This well-known technology has the following problems.

The first problem is an insufficient amount of a light flux that is taken out from aperture 506a that is formed on the exit side of light guide 505. The insufficient amount of a light flux reduces light use efficiency.

The lighting apparatus disclosed in JP2007-280793A is based on the assumption that the light flux from the light source, which has entered through aperture 503a of the entrance side, is repeatedly reflected between reflecting units 503 and 506 disposed on the entrance end and the exit end of light guide 505, and finally exits from aperture 506a of the exit side.

However, not all the light that has entered through aperture 503a of the entrance side reaches aperture 506a of the exit side. Some rays leak through aperture 503a of the entrance side while being repeatedly reflected. Such light leakage is more conspicuous as aperture 503a of the entrance side is larger. Light leaks through aperture 503a of the entrance side even when aperture 506a of the exit side is small.

More light loss occurs at reflecting units 503 and 506 since the number of times that light is reflected is larger. Light loss at reflecting units 503 and 506 is more conspicuous because apertures 503a and 506a of the reflecting units of the entrance and exit sides are smaller.

To improve the speckle reduction effect, it is effective to reduce aperture 506a of exit-side reflecting unit 506 as much as possible. In this case, however, the probability of an increase in light leakage from aperture 503a of the entrance side becomes higher, and more light losses at reflecting units 503 and 506 reduces light use efficiency.

When aperture 506a of the exit side of light guide 505 is large, the amount of a light flux taken out from aperture 506a of the exit side increases. In this case, however, the area of exit-side reflecting unit 506 relatively decreases. In other words, light reflected by exit-side reflecting unit 506 to return to the entrance side is reduced. A number of times that light is reciprocated between reflecting units 503 and 506 is accordingly smaller, resulting in a smaller speckle reduction effect. Simultaneously, an amount of light leaked from aperture 503a of the entrance side increases, and hence light use efficiency is reduced. Thus, aperture areas at the reflecting units need to have certain sizes.

The present invention has been developed in consideration of the abovementioned problems, and it is an object of the invention to provide a lighting apparatus capable of achieving higher light use efficiency and reducing speckles.

In order to achieve the object, the present invention provides a lighting apparatus that includes: a light source; a light guide that receives light from the light source to guide the light to an illumination object; a first mirror disposed on an entrance plane side of the light guide to reflect the light advancing toward the entrance plane side in the light guide to an exit plane side of the light guide; a diffusion plate disposed adjacently to the first mirror; a reflective polarizing plate disposed on the exit plane side of the light guide; a wavelength plate disposed between the light guide and the reflective polarizing plate; and a second mirror disposed among the light source, the first mirror, and the diffusion plate. The first and second mirrors include apertures formed to allow at least light from the light source to pass, and the second mirror reflects light leaked from the entrance plane side of the light guide toward the aperture of the first mirror.

The present invention thus configured enables acquisition of linear polarized light having uniform illuminance distribution characteristics. Thus, when a liquid crystal panel, that is an image display element, is an illumination object, the liquid crystal panel can be uniformly illuminated.

Among rays of light that has reached the exit plane side of the light guide, a ray returned to the light source side by the reflective polarizing plate reciprocates among the reflective polarizing plate, the wavelength plate, and the first mirror to be converted into light passable through the reflective polarizing plate, thereby increasing light use efficiency. The present invention enables the light leaked from the entrance plane side of the light guide to the light source side, to again enter the light guide through the aperture of the first mirror by the second mirror. According to the present invention, therefore, light losses can be reduced, and higher light use efficiency can be achieved.

The lighting apparatus of the present invention generates and emit light varied in optical path length through a propagation process in the light guide and an operation of the diffusion plate. Thus, for example, even when a laser source is used as the light source, coherence of a laser beam can be reduced. As a result, speckle noise is reduced. Therefore, irradiating a light valve such as a liquid crystal panel with a light flux from the lighting apparatus of the present invention enables acquisition of a high-quality projected image where speckles are reduced.

The second mirror of the lighting apparatus of the present invention can be a curved mirror having a convex surface directed to the light source side.

The second mirror of the lighting apparatus of the present invention can be disposed in a position where a curvature radius of the second mirror and a distance from a virtual vertex of the second mirror to the first mirror are equal to each other.

The light source of the lighting apparatus of the present invention can be a laser beam.

The light guide of the lighting apparatus of the present invention can be a rod integrator.

The first mirror of the lighting apparatus of the present invention can be disposed between the diffusion plate and the light guide.

Alternatively, the diffusion plate of the lighting apparatus of the present invention can be disposed between the first mirror and the light guide.

A projector of the present invention includes: a lighting apparatus of the present invention; and a projection optical system that projects light from the lighting apparatus.

According to the present invention, the lighting apparatus can achieve higher light use efficiency and reduce speckles.

BEST MODE FOR CARRYING OUT THE INVENTION

Hereinafter, embodiments of the present invention are described referring to the drawings.

Figure 2:
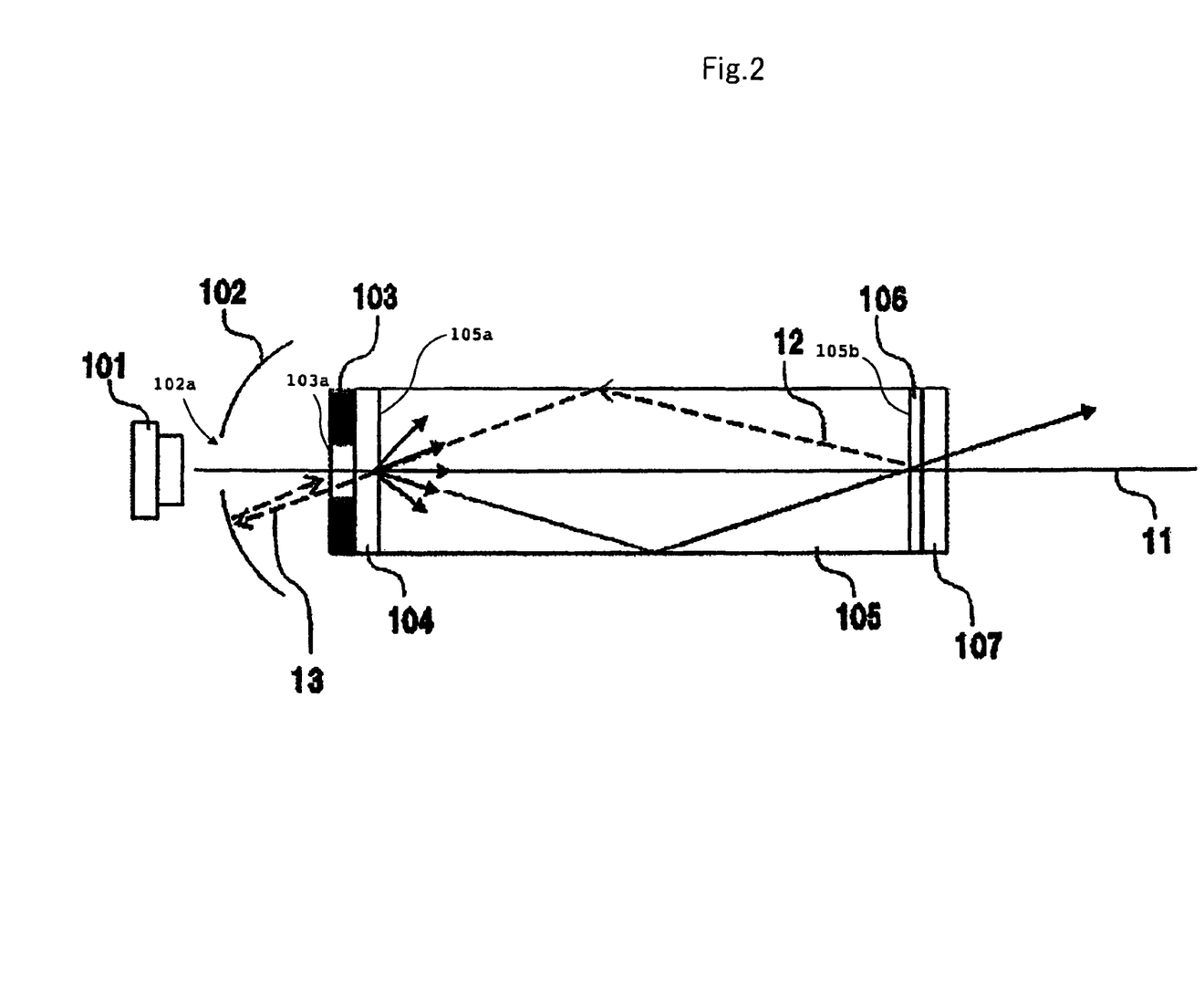
FIG. 2 is a diagram illustrating a configuration of a lighting apparatus according to the present invention.

FIG. 2 is a schematic diagram illustrating a configuration of a lighting apparatus according to the present invention.

The lighting apparatus of the present invention includes light source 101, rod integrator 105, reflecting mirror 103 that is a first mirror, diffusion plate 104, wavelength plate 106, reflective polarizing plate 107, and curved mirror 102 that is a second mirror.

In the lighting apparatus of the present invention, from light source 101 side, curved mirror 102, reflecting mirror 103, diffusion plate 104, rod integrator 105, wavelength plate 106, and reflective polarizing plate 107 are arrayed in this order.

Reflecting mirror 103 is disposed on entrance plane 105a side of rod integrator 105 that receives a laser beam from light source 101. Diffusion plate 104 is disposed adjacently to reflecting mirror 103. In FIG. 2, diffusion plate 104 is disposed between rod integrator 105 and reflecting mirror 103.

Reflective polarizing plate 107 is disposed on exit plane 105b side through which the light received by rod integrator 105 exits. Wavelength plate 106 is disposed between rod integrator 105 and reflective polarizing plate 107.

Curved mirror 102 is disposed among light source 101, reflecting mirror 103, and diffusion plate 104. A reflecting surface of curved mirror 102 is directed to rod integrator 105.

Apertures 103a and 102a are respectively formed in reflecting mirror 103 and curved mirror 102.

Hereinafter, each member is described in detail.

A laser source is used for light source 101. An optical beam having very high directivity, in other words, excellent linear advancing characteristics, is obtained from the laser source. A red semiconductor laser relatively high in optical output can be used for light source 101. A blue semiconductor laser can be used for light source 101. An optical output of about 0.5 W to 1 W can be obtained from the blue semiconductor laser. A green semiconductor laser can be used. A relatively high output that uses a second harmonic can be obtained from the green semiconductor laser. For light source 101, a solid-state laser can be used in addition to the semiconductor lasers.

Rod integrator 105 serving as a light guide guides the light from light source 101, which has been entered from entrance plane 105a side, to an illumination object placed on exit plane 105b side. A prismatic optical element is used for rod integrator 105. Rod integrator 105 includes six optically polished surfaces, i.e., an entrance plane, an exit plane, and four side planes. An optical glass is generally used as a material. However, an optical resin used for a plastic lens can be used. The entrance plane and the exit plane of rod integrator 105 have rectangular shapes. It is preferred that aspect ratios of the entrance plane and the exit plane be similar to that of a display panel used as a projector. For the light guide, in place of the rod integrator, a light tunnel including four plane mirrors formed into hollow prisms can be used.

Reflecting mirror 103 including aperture 103a is a plane mirror manufactured to be approximately equal in size to the entrance plane of rod integrator 105 by depositing aluminum on a thin plate glass. Reflecting mirror 103 can be manufactured by depositing silver or a dielectric multilayered film other than the aluminum. A non-deposition area is formed in the center of reflecting mirror 103, and aperture 103a is formed in the area. Aperture 103a can allow at least a laser beam from light source 101 to pass. The shape of aperture 103a can be circular. Not limited to the circular shape, however, aperture 103a can be elliptic, rectangular, or polygonal. It is preferred that the diameter of aperture 103a be larger than a beam diameter of a laser emitted from light source 101. Reflecting mirror 103 including such aperture 103a can be manufactured by a well-known technology.

For diffusion plate 104, in addition to a frosted-glass member of a well-known technology, a diffusion control film or a film formed by uniformly dispersing polyamide porous spherical fine particles in polymethylmethacrylate (PPMA) can be applied.

The diffusion control film, which has been commercialized by Luminit LLC, US, functions to diffuse a laser beam or light from the LED by a predetermined angle. The diffusion control film has a relatively high transmittance, and hence light loss is limited. The diffusion control film is a sheet film made of polycarbonate or polyester, and thus very thin and can be stuck to reflecting mirror 103.

The polyamide porous spherical fine particle is a functional material having a porous spherocrystal structure. Innumerable pores in a surface of the polyamide porous spherical fine particle approach the center, and hence the specific surface area is large, and light scattering characteristics are good. This functional material has successfully been developed by, for example, Ube Industries, Ltd.

It is preferred that the area of diffusion plate 104 be larger than the area of aperture 103a of reflecting mirror 103.

Curved mirror 102 including aperture 102a is disposed between light source 101 and reflecting mirror 103.

Figure 3:
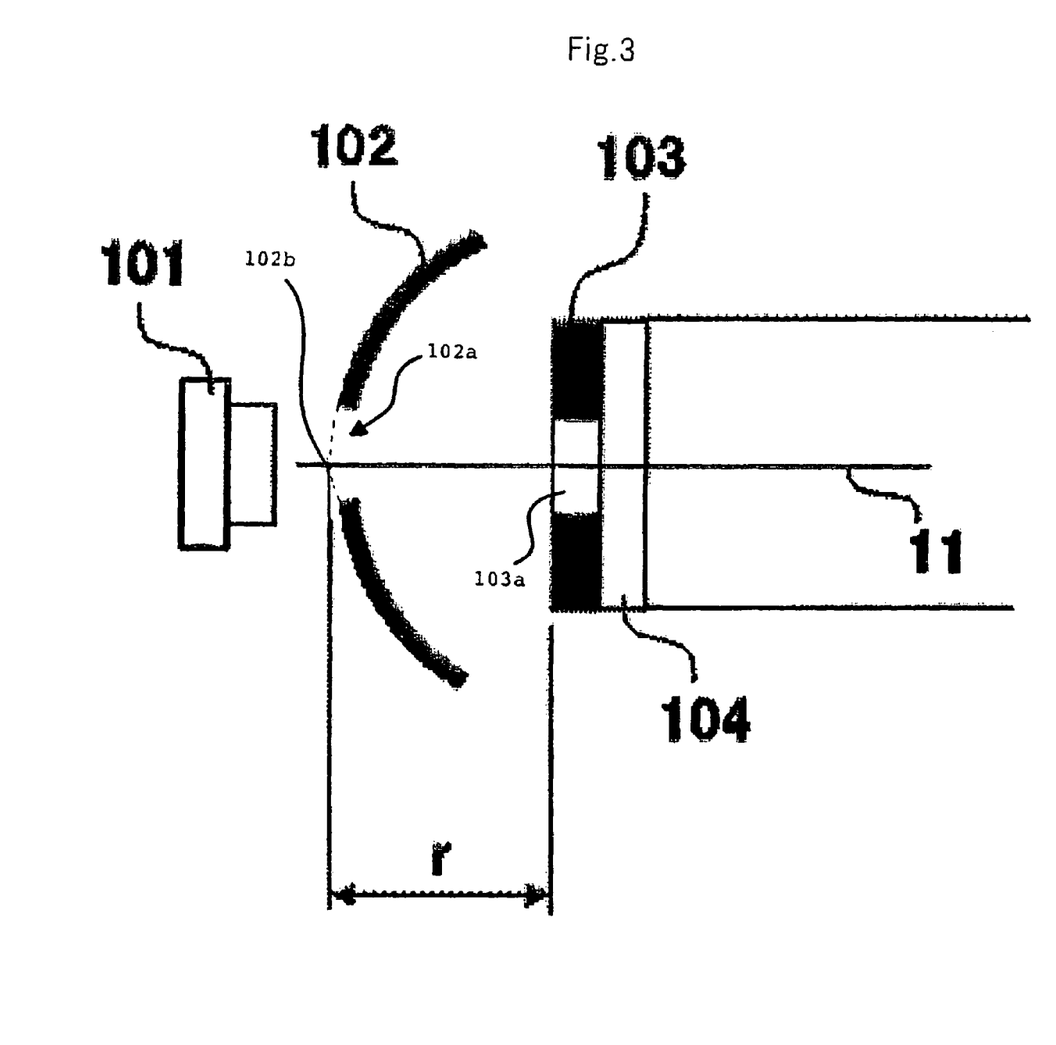
FIG. 3 is a partially enlarged diagram of the lighting apparatus according to the present invention.

Aperture 102a is formed in a center of curved mirror 102. Curved mirror 102 can accordingly be formed into, for example, a torus shape. A convex surface of curved mirror 102 is directed to light source 101 side. A side of curved mirror 102 where a reflecting surface has been formed is directed to rod integrator 105 side that is a light guide. Curved mirror 102 can use a resin as a material in addition to a glass or a metal. Curved mirror 102 can be manufactured by vacuum-depositing aluminum on such a material. This kind of curved mirror 102 can be easily obtained. It is preferred that aperture 102a of curved mirror 102 be larger than the diameter of the laser beam emitted from light source 101a. Aperture 102a is not limited to a circular shape. For example, other shapes can be selected based on ease of processing. As illustrated in FIG. 3, curved mirror 102 is disposed in a position where the distance between virtual vertex 102b of curved mirror 102 and reflecting mirror 103 is distance r. Curved mirror 102 includes aperture 102a, and hence there is actually no portion equivalent to the vertex of a curved mirror shaped without any aperture 102a. Thus, a position equivalent to the vertex of the curved mirror shaped without any aperture 102a is set as virtual vertex 102b, and distance r is defined based on virtual vertex 102b. A curvature radius of curved mirror 102 matches distance r. In other words, the curvature radius of curved mirror 102 is also denoted by r. In the embodiment, the curved mirror is used as the second mirror. However, any shape can be employed as long as light leaked from the entrance plane side of rod integrator 105 can be reflected toward aperture 103a of reflecting mirror 103.

Referring back to FIG. 2, a film-like plate is used for wavelength plate 106. Wavelength plate 106 of the embodiment is generally used for a projector, and can be easily stuck to the exit plane of rod integrator 105. The size of wavelength plate 106 is equal to that of the exit plane of rod integrator 105.

The polarizing plate of a wire-grid type can be used for reflective polarizing plate 107. For example, the polarizing plate of the wire-grid type has a structure where fine metal wires such as aluminum are arranged in a grid pattern on a plate glass. The polarizing plate of the wire-grid type operates to transmit polarized light having a vibration direction vertical to the wires and to reflect polarized light having a vibration direction parallel to the wires. It is preferred that the size of reflective polarizing plate 107 be equal to that of the exit plane of rod integrator 105. Recently, a film-like reflective polarizing plate has been developed. As in the case of the previous type, the film-like reflective polarizing plate includes fine metal wires. However, the film-like reflective polarizing plate can be formed very thin, and stuck to wavelength plate 106.

FIG. 2 illustrates the configuration example where from light source 101 side, curved mirror 102, reflecting mirror 103, and diffusion plate 104 are arrayed in this order. In addition to this configuration, the present invention allows sequential arrangement of curved mirror 102, diffusion plate 104, and reflecting mirror 103 from light source 101 side. In other words, reflecting mirror 103 and diffusion plate 104 can be switched in position.

Figure 4:
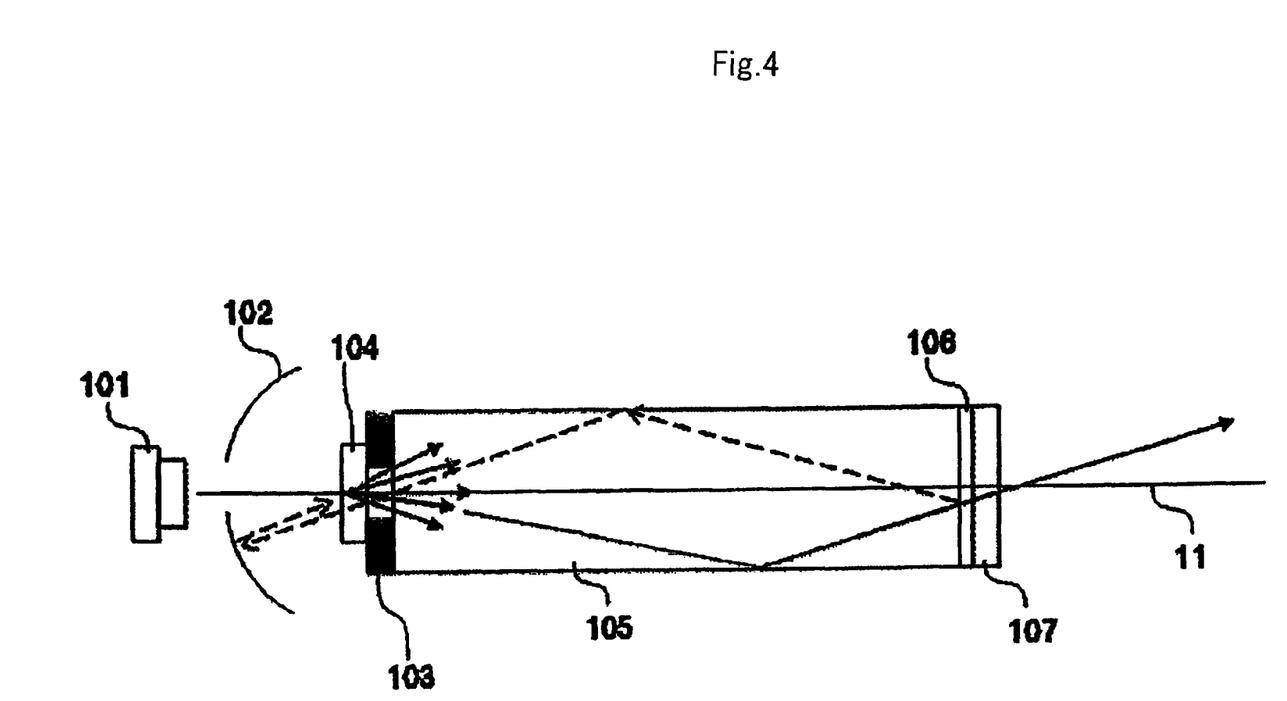
FIG. 4 is a diagram illustrating a modified example of the lighting apparatus of the present invention.
Figure 5:
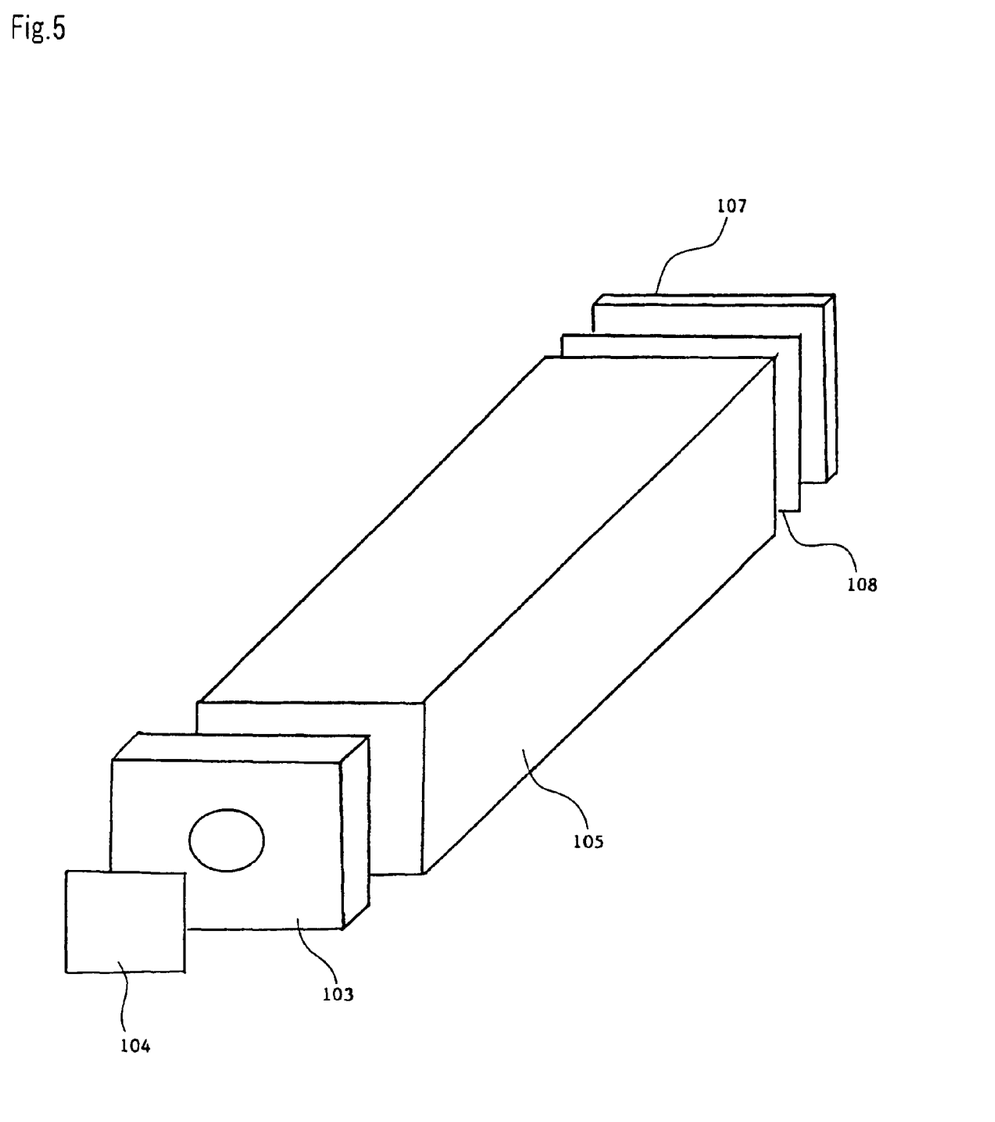
FIG. 5 is a perspective diagram of the lighting apparatus illustrated in FIG. 4.

FIG. 5 is a perspective diagram of the configuration illustrated in FIG. 4. As illustrated in FIG. 5, diffusion plate 104 only needs to have a size that is sufficient to cover at least aperture 103a of reflecting mirror 103.

Next, an operation of the lighting apparatus of the embodiment is described.

Referring to FIG. 2, the operation is described.

The laser beam emitted from light source 101 linearly advances to pass through aperture 102a of curved mirror 102 and aperture 103a of reflecting mirror 103, and then reaches diffusion plate 104. The laser beam is diffused by diffusion plate 104 to become a light flux having a predetermined spread. A spread angle can be arbitrarily selected based on characteristics of diffusion plate 104 to be used.

The light flux advances in rod integrator 105. Light that reaches the side plane of rod integrator 105, while it is advancing, travels ahead while being continuously propagated by full reflection. In other words, almost no light leaks from the side plane of rod integrator 105. Generally, even when the nature of the laser source is polarized light, the diffusing operation of diffusion plate 104 disturbs the polarized light. Repeated inner-surface reflection in rod integrator 105 rotates the polarizing axis, and hence polarized components of light reaching wavelength plate 106 may not be uniformed its polarizing axis.

The light flux subsequently passes through wavelength plate 106 to reach reflective polarizing plate 107. In this case, light of a linear polarized component passable through reflective polarizing plate 107 exits from the lighting apparatus to be used for illuminating the display panel. On the other hand, linear polarized light (ray 12 in FIG. 2) reflected by reflective polarizing plate 107 advances toward diffusion plate 104 in rod integrator 105.

The light that has traveled toward diffusion plate 104 side reaches diffusion plate 104, and then reaches reflecting mirror 103. Light reflected by a portion other than aperture 103a of reflecting mirror 103 changes its course toward reflective polarizing plate 107 again to advance. The light naturally advances while being repeatedly reflected on the inner surface in rod integrator 105. After passage through wavelength plate 106, the light reaches reflective polarizing plate 107. Such light passes through wavelength plate 106 twice while advancing and returning to be converted into light of a polarized component passable through reflective polarizing plate 107. As a result, the light exits from the reflective polarizing plate 107 to be used for illuminating the display panel.

On the other hand, a part of the light reflected by reflective polarizing plate 107, which has reached aperture 103a of reflecting mirror 103 of the entrance side, leaks to light source 101 side. The light leaked from aperture 103a to light source 101 side (ray 13 in FIG. 2) reaches curved mirror 102. The light is reflected by curved mirror 102, and condensed again at aperture 103a of reflecting mirror 103 to be supplied into rod integrator 105. This occurs because the curvature radius and the arranging position of curved mirror 102 have been defined to enable light condensing at aperture 103a of reflecting mirror 103. The light thus supplied again into rod integrator 105 behaves as in the case of the light reflected by reflecting mirror 103 to reach reflective polarizing plate 107, and exits from reflective polarizing plate 107 to be used as illumination light.

The light leaked from aperture 103a to light source 101 side includes a part leaked, though small in amount, from aperture 102a of curved mirror 102 to light source 101 side.

However, the diameter of the laser beam is very small, and hence considering that aperture 102a of curved mirror 102 has a commensurate size, a most of the portion of the light emitted from light source 101 is used as illumination light. In order to reduce the light leaked from aperture 103a as much as possible, it is effective to increase the curvature radius of curved mirror 102 and correspondingly increase the diameter. As a result, an area of aperture 103a with respect to the area of curved mirror 102 occupying the diameter can be relatively reduced, and hence the rate of light to be recovered increases.

Thus, the most of the portion of the light of the component reflected by reflective polarizing plate 107 on the exit side of rod integrator 105 is recovered by reflecting mirror 103 and curved mirror 102 of the entrance side to be used for illumination. As a result, a lighting apparatus of very high efficiency can be provided. Simultaneously, during the process of the diffusion operation of diffusion plate 104 disposed on the entrance side of rod integrator 105 and light reutilization by reflective polarizing plate 107, reflecting mirror 103, and curved mirror 102, an optical path difference equal to or more than a coherence length can be easily set between reusable light and non-reusable light. Thus, the lighting apparatus of the embodiment provides a high speckle reduction effect because interferences between rays of light emitted as illumination light are reduced.

Next, a configuration example of a liquid crystal projector that uses the lighting apparatus of the embodiment is described.

Figure 6:
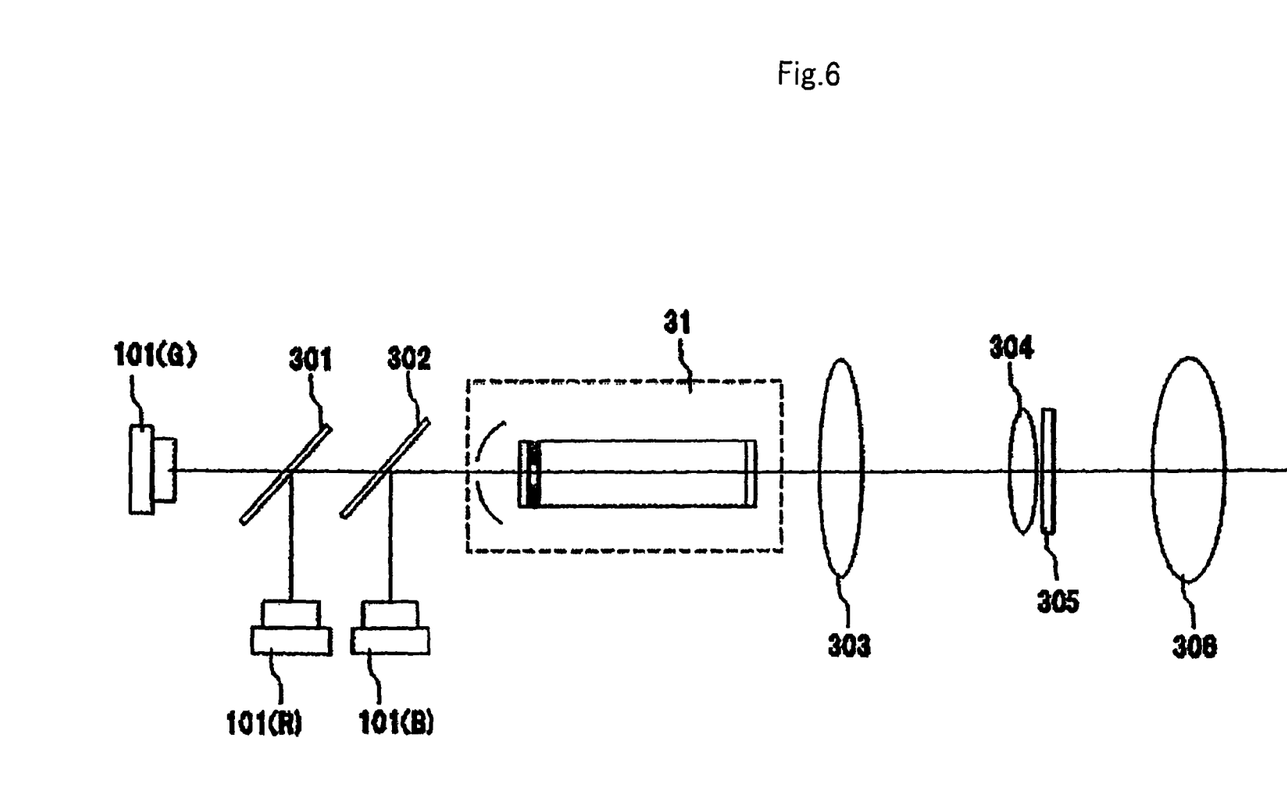
FIG. 6 is a diagram illustrating a configuration of a projector that uses the lighting apparatus of the present invention.

FIG. 6 illustrates a configuration of the projector that uses the lighting apparatus of the embodiment.

As light sources, laser light sources 101(G), 101(R), and 101(B) that respectively generate green, red, and blue beams are used. In order to match optical paths of laser light sources 101(G), 1101(R), and 101(B), dichroic mirrors 301 and 302 are disposed between laser light source 101(G) and curved mirror 102.

Dichroic mirror 301 has characteristics of transmitting green light and of reflecting red light. Dichroic mirror 302 has characteristics of transmitting the red light and the green light and of reflecting blue light. Such characteristics are within a well-known technology, and are obtained by depositing a dielectric multilayered film.

The projector includes lighting apparatus (excluding light source) 31 of the present invention, field lens 303, condenser lens 304, liquid-crystal display panel 305, and projection lens 306. This configuration is a configuration example of a single display panel, where color displaying is performed by supplying the green light, the red light, and the blue light to the liquid-crystal display panel in time division. More specifically, each light source is repeatedly turned on and off to supply color light in time division.

A beam from light source 101 is supplied to lighting apparatus 31, made uniform in polarization, recovered, and speckle-reduced by lighting apparatus 31, and then exits as illumination light from lighting apparatus 31. The illumination light that has exited is applied as a light flux having a uniform illuminance distribution to an effective display area of liquid-crystal display panel 305 by field lens 303 and condenser lens 304. The illumination light is then enlarged to be projected on a screen (not shown) by projection lens 306.

Polarizing plates (not shown) are disposed before and behind the liquid-crystal display panel. For the liquid-crystal display panel, generally, a Twisted Nematic crystal and other liquid-crystal display panels can be used. Lighting apparatus 31 supplies linear polarized light of a predetermined vibration direction to liquid-crystal display panel 305. The light from lighting apparatus 31 is light where use efficiency of light from light source 101 is high, and hence the finally projected enlarged image is bright. The light from lighting apparatus 31 is applied as light having a speckle reduction effect, and thus the finally projected enlarged image is an image where speckles have been reduced.

Figure 7:
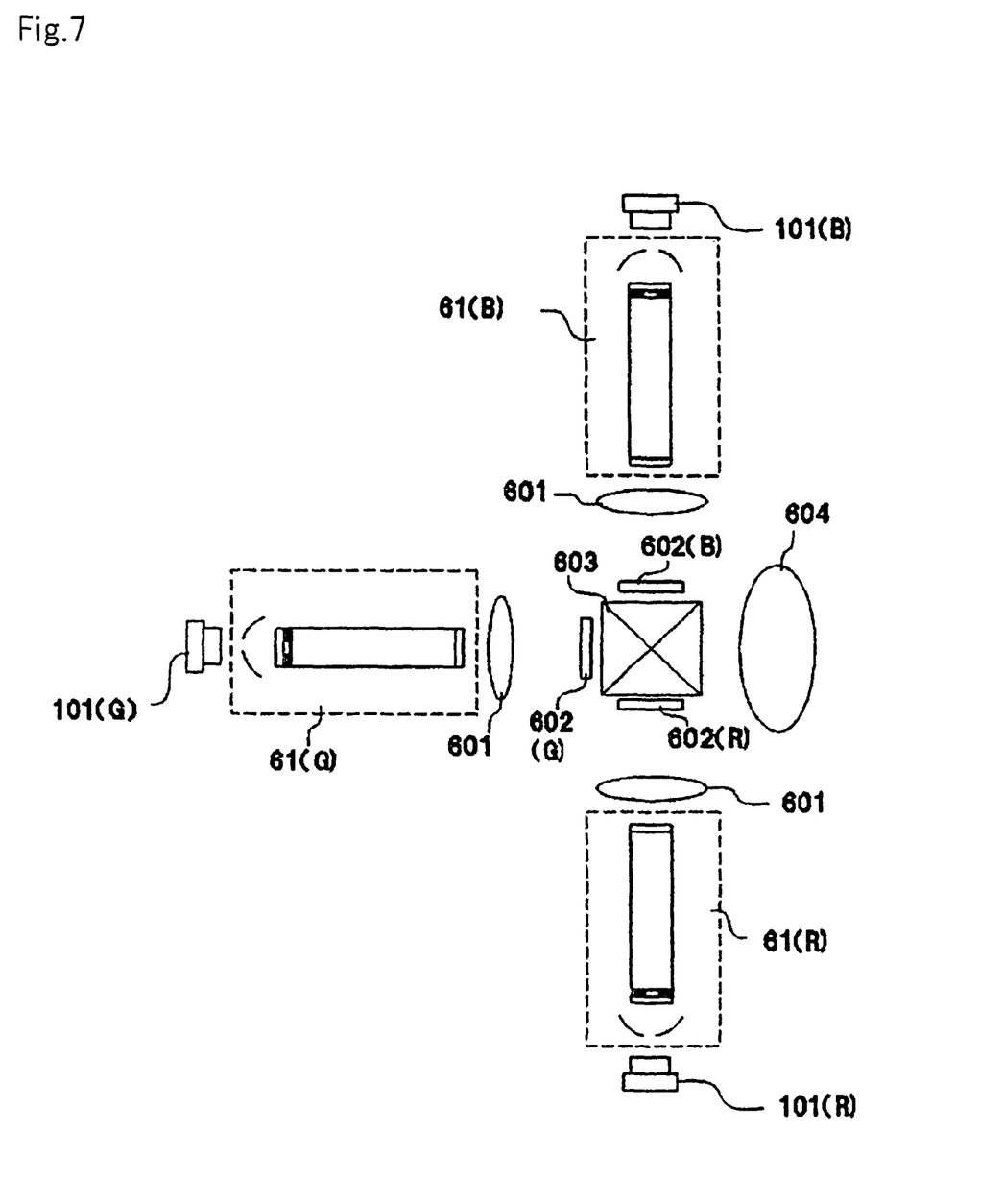
FIG. 7 is a diagram illustrating another configuration of a projector that uses the lighting apparatus of the present invention.

FIG. 6 illustrates the configuration example of the projector that includes the single display panel. However, as illustrated in FIG. 7, the projector can employ a three panel system that uses red, green, and blue liquid-crystal display panels. The projector of this system includes light sources 101(G), 101(B), and 101(R), lighting apparatus 61(G), 61(B), 61(R), field lens 601, liquid-crystal display panels 602(G), 602(B), and 602(R), cross dichroic prism 603, and projection lens 604. A beam from each light source 101 is supplied to each lighting apparatus 61, and applied as illumination light having high light use efficiency and a speckle reduction effect to the liquid-crystal display panel. Thus, the projected enlarged image has high display quality.

Figure 8:
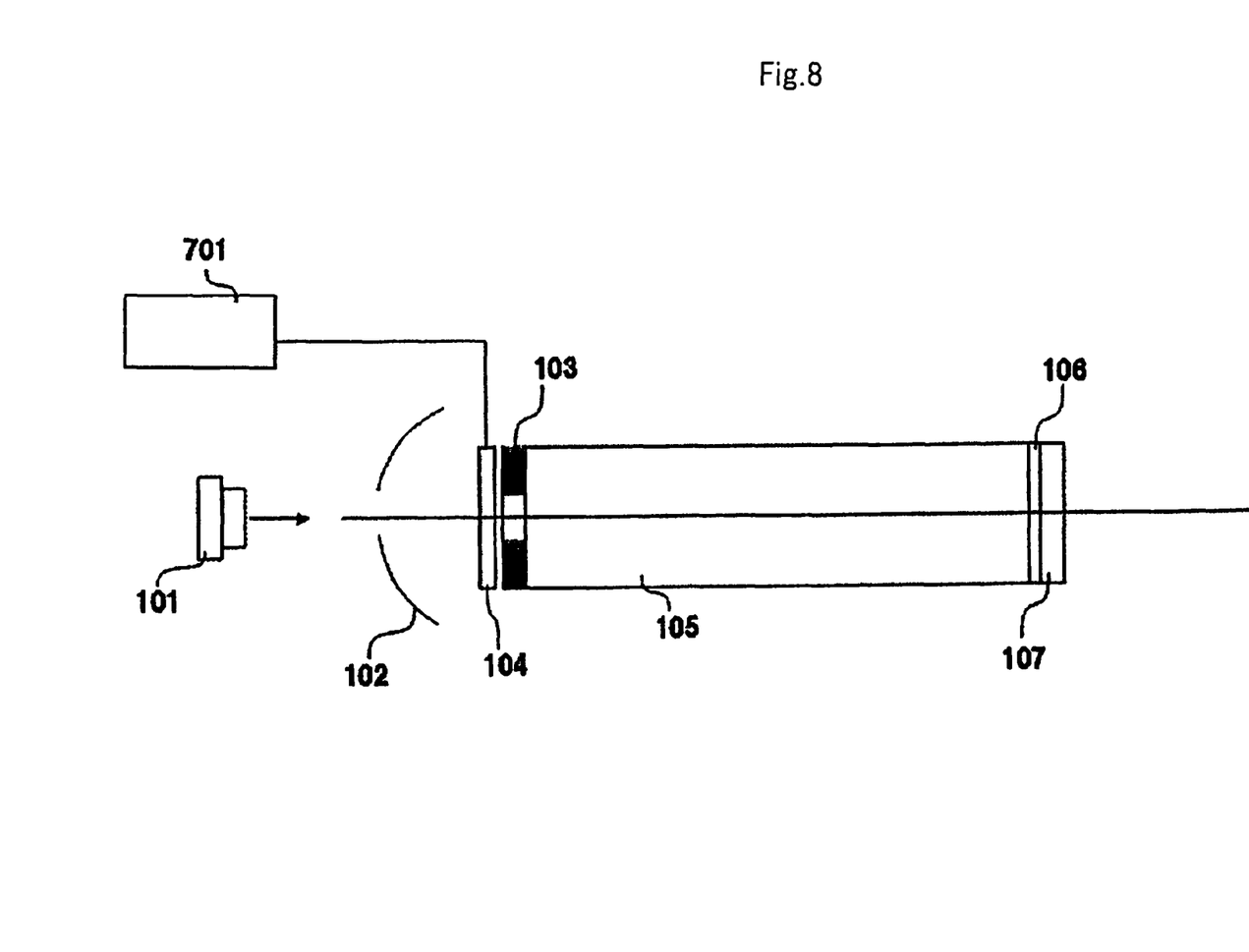
FIG. 8 is a diagram illustrating another modified example of the lighting apparatus of the present invention.

The lighting apparatus of the embodiment enables acquisition of light with high light use efficiency of the light source and a speckle reduction effect. To further enhance the speckle reduction effect, as illustrated in FIG. 8, diffusion plate 104 is vibrated by using vibrating unit 701. Thus, a better speckle reduction effect is obtained. For example, a light-source cooling fan and diffusion plate 104 are connected to be held by a sheet metal. A sufficient vibration effect can accordingly be obtained by a relatively simple structure. A phase distribution when the laser beam enters rod integrator 105 through aperture 103a of reflecting mirror 103 can be randomly changed, realizing a better speckle reduction effect as a result.

The present invention has been described by way of embodiment. However, the present invention is not limited to the embodiment. Various changes can be made to the configuration and the details of the present invention within the scope of the invention understandable to those skilled in the art.

The invention claimed is:

1. A lighting apparatus comprising:
    a laser source emitting light;
    a light guide that guides the light to an illumination object;
    a first mirror that is disposed on an entrance plane side of the light guide to reflect the light advancing toward the entrance plane side in the light guide to an exit plane side of the light guide;
    a diffusion plate disposed adjacently to the first mirror;
    a reflective polarizing plate disposed on the exit plane side of the light guide;
    a wavelength plate disposed between the light guide and the reflective polarizing plate; and
    a second mirror disposed between the laser source and the first mirror,
    wherein the first mirror includes an aperture formed to allow at least the light from the laser source to pass,
    wherein the second mirror includes an aperture in a center of the second mirror so as to allow at least the light linearly advancing from the laser source to pass,
    wherein the diffuser diffuses the light linearly advancing from the laser source to become diffused light having a spread angle, and
    wherein the second mirror reflects the light reflected by the reflective polarizing plate and leaked from the aperture of the first mirror toward the aperture of the first mirror.

2. The lighting apparatus according to claim 1, wherein the second mirror comprises a curved mirror having a convex surface directed to the laser source.

3. The lighting apparatus according to claim 2, wherein the second mirror is disposed in a position in which a curvature radius of the second mirror and a distance from a virtual vertex of the second mirror to the first mirror are equal to each other.

4. The lighting apparatus according to claim 1, wherein the light guide comprises a rod integrator.

5. The lighting apparatus according to claim 1, wherein the first mirror is disposed between the diffusion plate and the light guide.

6. The lighting apparatus according to claim 1, wherein the diffusion plate is disposed between the first mirror and the light guide.

7. A projector comprising:
    the lighting apparatus according to claim 1; and
    a projection optical system that projects light from the lighting apparatus.

8. The lighting apparatus according to claim 2, wherein the light guide comprises a rod integrator.

9. The lighting apparatus according to claim 3, wherein the light guide comprises a rod integrator.

10. The lighting apparatus according to claim 2, wherein the first mirror is disposed between the diffusion plate and the light guide.

11. The lighting apparatus according to claim 3, wherein the first mirror is disposed between the diffusion plate and the light guide.

12. The lighting apparatus according to claim 4, wherein the first mirror is disposed between the diffusion plate and the light guide.

13. The lighting apparatus according to claim 2, wherein the diffusion plate is disposed between the first mirror and the light guide.

* * * * *